(12) United States Patent
Gill

(10) Patent No.: US 6,473,277 B1
(45) Date of Patent: Oct. 29, 2002

(54) READ HEAD WITH LEADS TO SHIELDS SHORTS FOR PERMITTING A THINNER SECOND READ GAP LAYER AND IMPROVING READ SIGNAL SYMMETRY

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,726

(22) Filed: May 3, 2000

(51) Int. Cl.[7] ............................................. G11B 5/127
(52) U.S. Cl. ...................................................... 360/319
(58) Field of Search .............................. 360/319, 126, 360/123, 121

(56) References Cited

U.S. PATENT DOCUMENTS

| | | |
|---|---|---|
| 5,557,491 A | 9/1996 | Gill et al. |
| 5,557,492 A | 9/1996 | Gill et al. |
| 5,875,080 A * | 2/1999 | Seagle .......................... 360/123 |
| 6,209,193 B1 * | 4/2001 | Hsiao ........................... 360/319 |
| 6,219,205 B1 * | 4/2001 | Yuan et al. ................... 360/319 |

* cited by examiner

*Primary Examiner*—Allen Cao
(74) *Attorney, Agent, or Firm*—Ervin F. Johnston

(57) ABSTRACT

A read head has first and second leads that are shorted to first and second shields so that the first and second shields function as lead layer extensions for the first and second leads. This permits a second read gap layer to be thinner so that a free layer structure of a spin valve sensor is located closer to a second shield layer. This increases a net imaging current field $H_{IM}$ which can be employed for counterbalancing a strong sense current field $H_I$ due to conductive layers on one side of the free layer structure. Connection of the first and second lead layers to the first and second shield layers promotes heat dissipation from the first and second lead layers and a thinner second read gap layer promotes linear read density of the head.

53 Claims, 5 Drawing Sheets

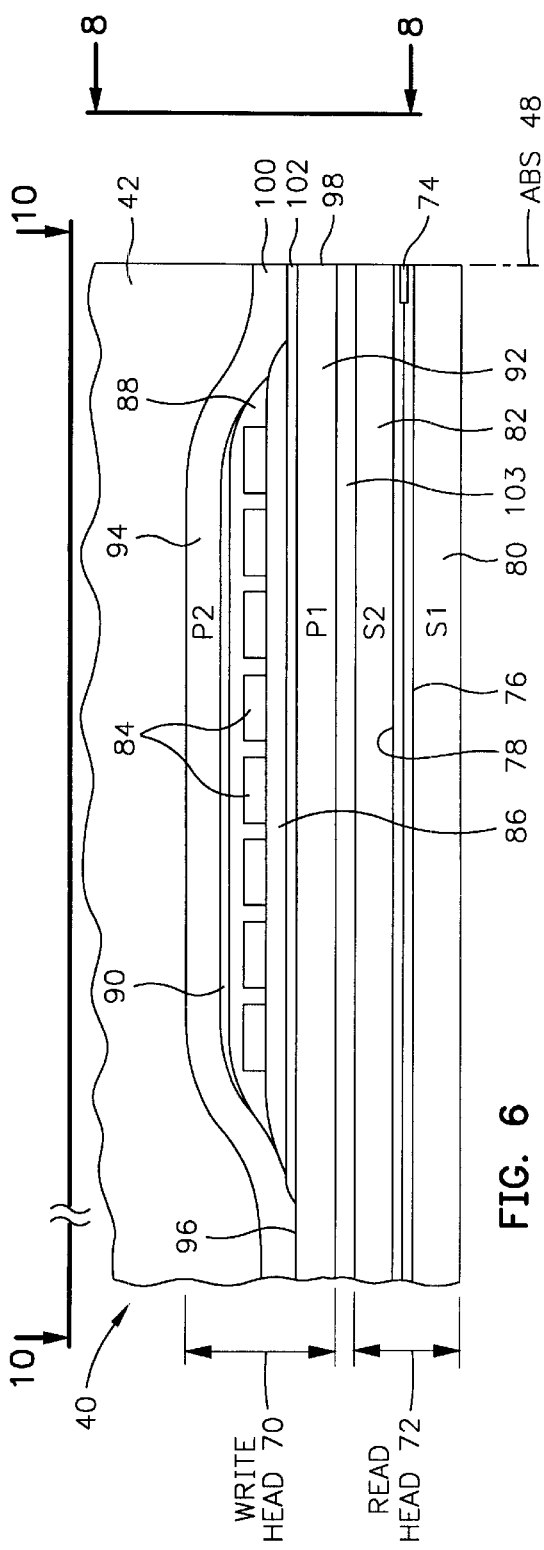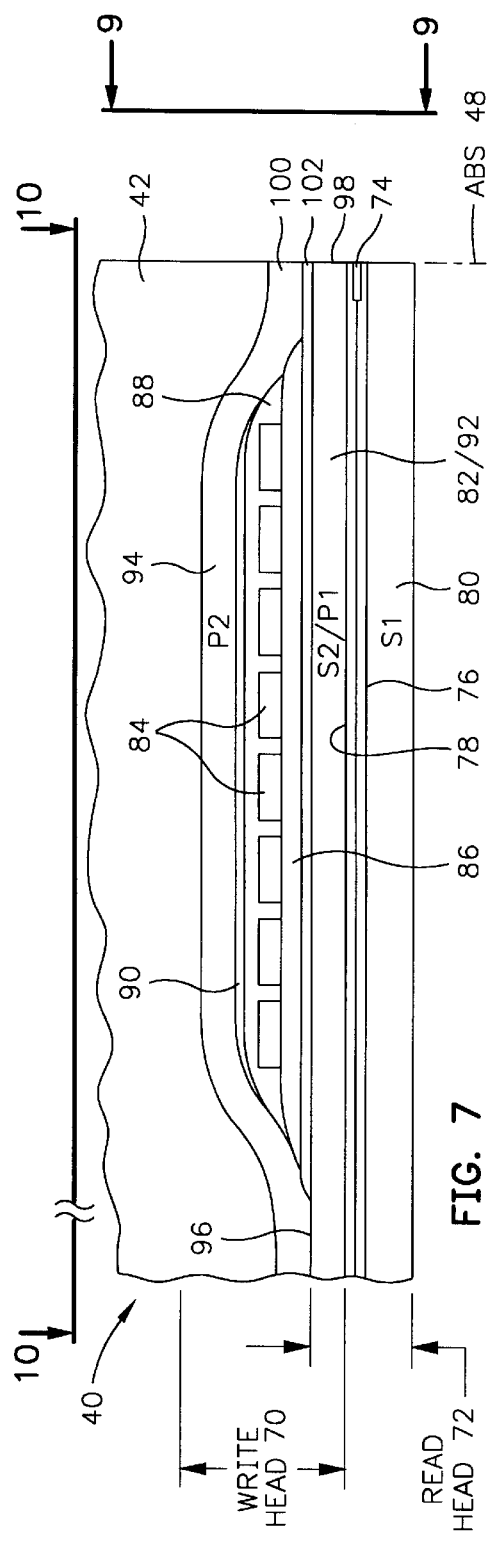

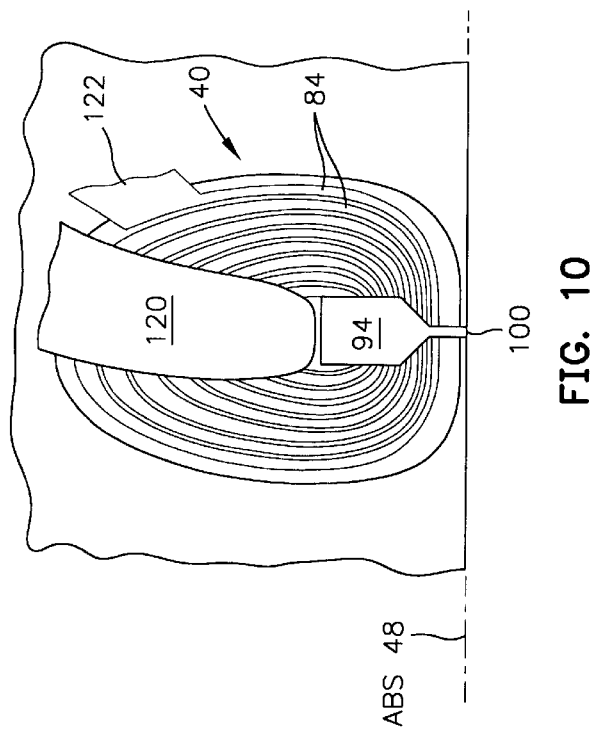
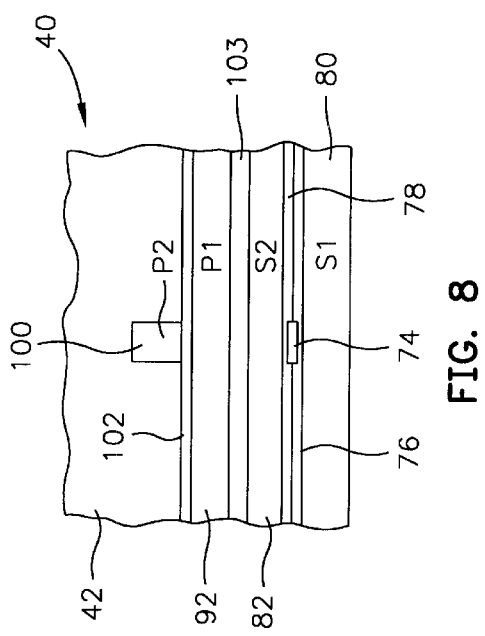
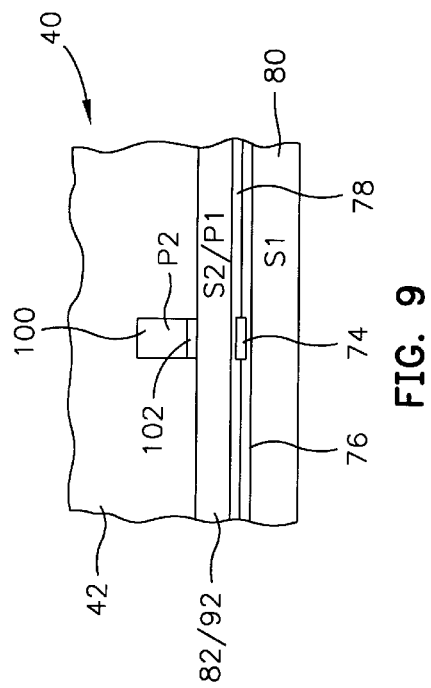
FIG. 8
FIG. 9
FIG. 10

READ HEAD WITH LEADS TO SHIELDS SHORTS FOR PERMITTING A THINNER SECOND READ GAP LAYER AND IMPROVING READ SIGNAL SYMMETRY

BACKGROUND OF THE INVENTION

1. Field of the Invention

The present invention relates to a read head with leads to shields shorts for permitting a thinner second read gap layer and improving read signal symmetry and, more particularly, to such a read head wherein the first and second shield layers are extensions of the first and second lead layers.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinning layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. When a sense current is conducted through the spin valve sensor, resistance changes cause potential changes that are detected and processed as playback signals from the rotating magnetic disk. The sensitivity of the spin valve sensor is quantified as magnetoresistance or magnetoresistive coefficient dr/R where dr is the change in resistance of the spin valve sensor from muinimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

$$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry. There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. The magnetic instability of the free layer is greater when the readback asymmetry is positive than when the readback asymmetry is negative.

The location of the transfer curve relative to the bias point is influenced by three major forces on the free layer of a spin valve sensor, namely a ferromagnetic coupling field $H_{FC}$ between the pinned layer and the free layer, a net demagnetizing (demag) field $H_D$ from the pinned layer, and a net sense current field $H_I$ from all conductive layers of the spin valve except the free layer. The strongest of these forces is the net sense current field $H_I$ from the conductive layers of the spin valve sensor. In a bottom spin valve sensor where the free layer structure is closer to the second shield layer than to the first shield layer the majority of the conductive layers is located between the free layer structure and the first shield layer. The only conductive layer between the free layer structure and the second shield layer is a cap layer typically constructed of tantalum (Ta) which has a high resistance to the sense current. Accordingly, when the sense current is conducted through the spin valve sensor the net sense current field $H_I$ acting on the free layer structure is due to the sense current fields caused by the conductive layers between the free layer structure and the first shield layer minus the small sense current field due to the cap layer. The difference is the net sense current field which, as stated hereinabove, is the largest field acting on the free layer structure urging the magnetic moment of the free layer structure to be positioned at some angle to a zero bias position which is parallel to the ABS.

The sense current field needs to be counterbalanced so that the magnetic moment of the free layer will remain parallel to the ABS when the read head is in the quiescent condition. The forces available for counterbalancing are the aforementioned net demag field $H_D$ and the ferromagnetic coupling field $H_{FC}$. The net demag field $H_D$ depends upon the type of pinned layer structure employed in the spin valve sensor. If the pinned layer structure is a single ferromagnetic layer composed of one or more ferromagnetic films the demag field $H_D$ is higher than when an antiparallel (AP) pinned layer structure is employed. Accordingly, the single pinned layer would be advantageous for providing a greater demag field $H_D$ for counterbalancing the net sense current field $H_I$. However, the AP pinned layer structure is more desirable for a spin valve sensor than the single pinned layer since the AP pinned layer structure has improved thermal stability, that is, its magnetic moment retains a pinned direction at higher temperatures and fields than the single pinned layer. The AP pinned layer structure includes an antiparallel coupling layer which is located between ferromagnetic first and second AP pinned layers. Since there is partial flux closure between the first and second AP pinned layers the net demag field $H_D$ is considerably less than a single pinned layer. This causes a greater exchange coupling between the first AP pinned layer and the pinning layer for promoting the aforementioned thermal stability. Accordingly, it would be desirable to employ the AP pinned layer structure in the spin valve sensor even though its effect of counterbalancing the net sense current field $H_I$ is less than the single pinned layer. Typically, the ferromagnetic coupling field $H_{FC}$ is antiparallel to the net demag field $H_D$ which means that the ferromagnetic coupling field $H_{FC}$ is additive with the sense current field $H_I$. This unfortunately increases read signal asymmetry. Accordingly, there is a need for providing a read head wherein read signal asymmetry can be lessened even though an AP pinned layer structure is employed.

SUMMARY OF THE INVENTION

The present invention provides a read head with a first lead layer from a spin valve sensor shorted to the first shield layer and a second lead layer from the spin valve sensor shorted to the second shield layer so that the first and second shield layers function as lead extensions for the first and second lead layers to terminals of the read head. In this manner the first and second lead layers can be significantly thinner than prior art first and second lead layers since the first and second lead layers can extend for a relatively short distance before being shorted to the first and second shield layers so that the first and second shield layers provide a large expanse of conductive material to carry the sense current to and from the read head terminals. When the first and second lead layers are thinner this causes each of the first and second lead layers to have a smaller step or rise as it extends from the spin valve sensor. Accordingly, with smaller steps the second read gap layer has less likelihood of having pin holes where it covers the steps. This means that the second read gap layer can be thinner than previous second read gap layers and still provide adequate coverage and insulation over the steps of the first and second lead layers without developing pin holes which, in turn, cause shorts between the lead layers and the shields. In the present invention, however, coverage of the step of only one of the lead layers is necessary since the other lead layer is shorted to the second shield layer.

The thinner second read gap layer performs three important functions, namely: (1) promotes read signal symmetry; (2) improves heat dissipation between the lead layers and the shield layers; and (3) promotes linear read density. Because of the conduction of the sense current $I_S$ through the spin valve sensor each of the first and second shield layers produces an image current field $H_{IM}$ which is exerted on the free layer structure. Since the free layer structure in a bottom spin valve sensor is located closer to the second shield layer than to the first shield layer, there is a net image current field $H_{IM}$ which can be employed for counterbalancing the sense current field $H_I$. However, when the second read gap layer is made thinner this places the free layer structure even closer to the second shield layer which will increase the net image current field $H_{IM}$ for still further counterbalancing the net sense current field $H_I$ on the free layer structure. The second advantage occurs because the lead layers are directly connected to the shield layers so that the shield layers function as heat sinks for the first and second lead layers. Further, since the second read gap layer is thinner there is still further heat dissipation between the first lead layer, which is connected to the first shield layer, and the second shield layer. In regard to the third advantage, the thinner second read gap layer decreases the read gap which is measured between the first and second shield layers so that the read head is capable of writing more bits per linear inch along a track of a rotating magnetic disk. In a preferred embodiment the invention employs a pinning layer which is made of platinum manganese (PtMn) which provides a negative ferromagnetic coupling field $-H_{FC}$ which is parallel to the net demag field $H_D$ and parallel to the net imaging field $H_{IM}$ so that the sense current field is counterbalanced by three fields, namely, net demag field $H_D$, net imaging field $H_{IM}$ and ferromagnetic coupling field $H_{FC}$.

An object of the present invention is to provide a read head wherein a net sense current field $H_I$ acting on a free layer structure of a spin valve sensor can be more adequately counterbalanced by other magnetic fields for promoting read signal symmetry.

Another object is to accomplish the previous object with an antiparallel (AP) pinned layer type spin valve sensor.

A further object is to provide the foregoing objects along with improved heat dissipation from first and second lead layers of the read head.

Still another object is to accomplish the foregoing objects along with increasing linear read density of the read head.

Other objects and advantages of the invention will become apparent upon reading the following description taken together with the accompanying drawings.

DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIGS. 6 or 7 with all material above the coil layer and leads removed.

DETAILED DESCRIPTION OF THE PREFERRED EMBODIMENTS

Magnetic Disk Drive

Figure 1:
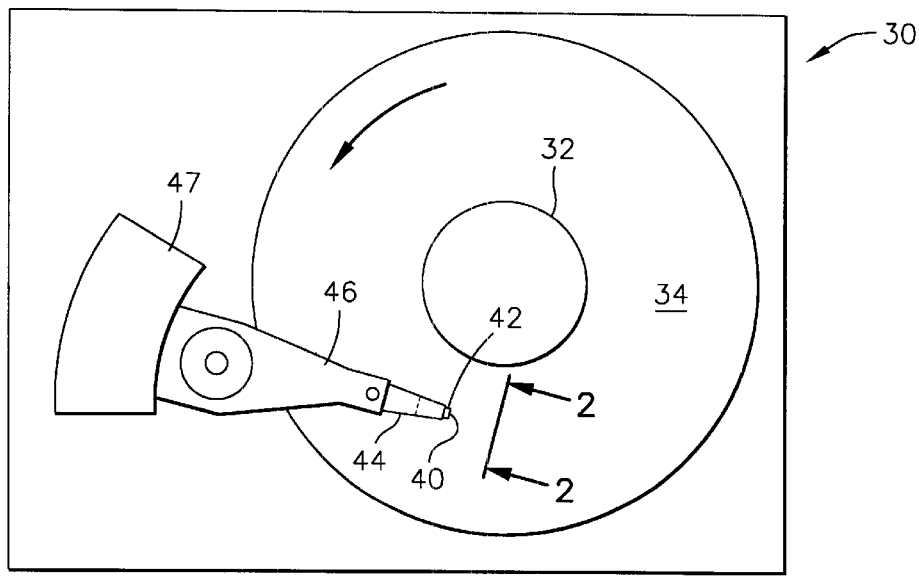
FIG. 1 is a plan view of an exemplary magnetic disk drive.
Figure 2:
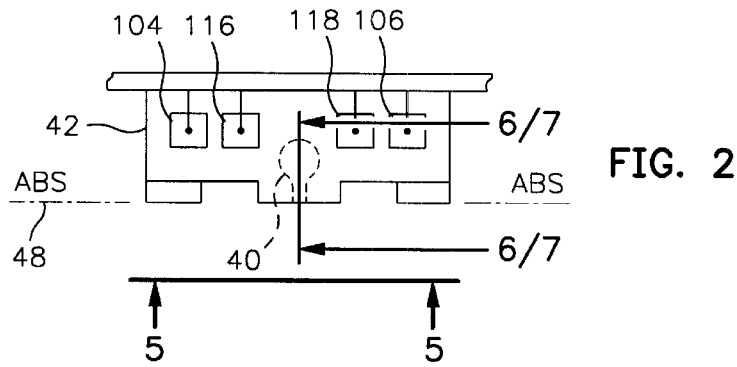
FIG. 2 is an end view of a slider with a magnetic head of the disk drive as seen in plane 2—2 of FIG. 1.
Figure 3:
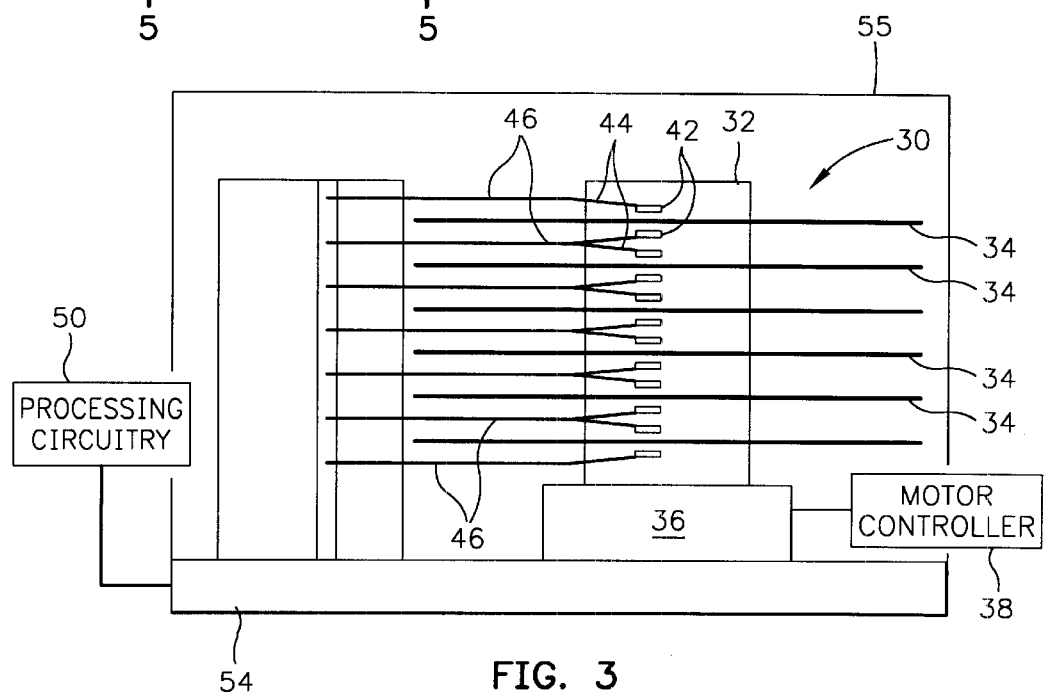
FIG. 3 is an elevation view of the magnetic disk drive wherein multiple disks and magnetic heads are employed.
Figure 4:
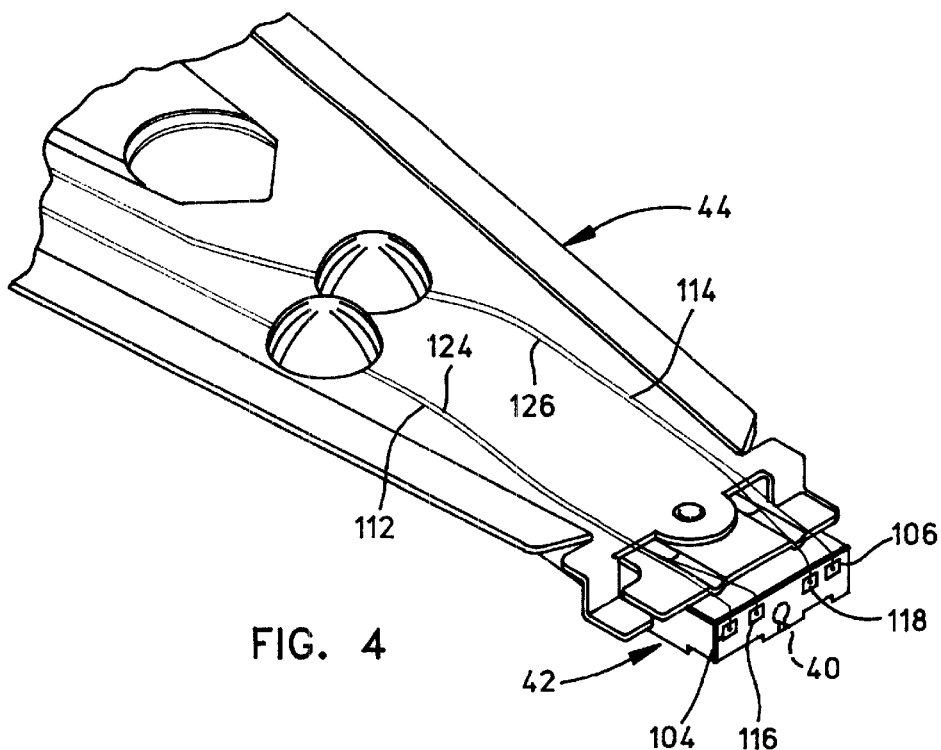
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
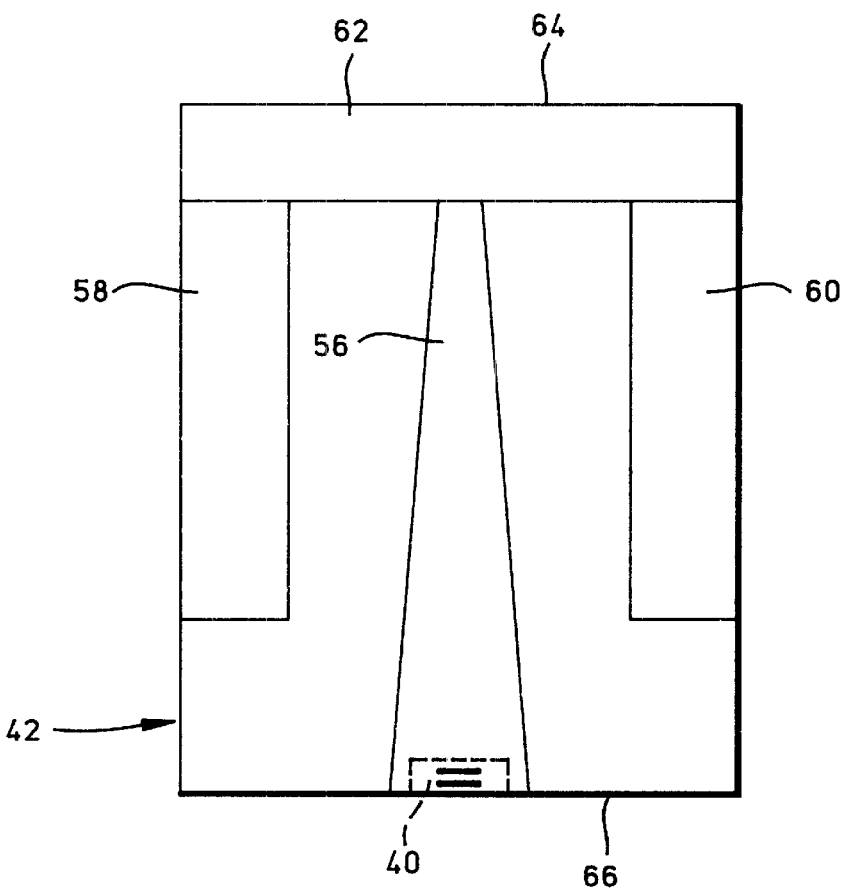
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

The Invention

Figure 11:
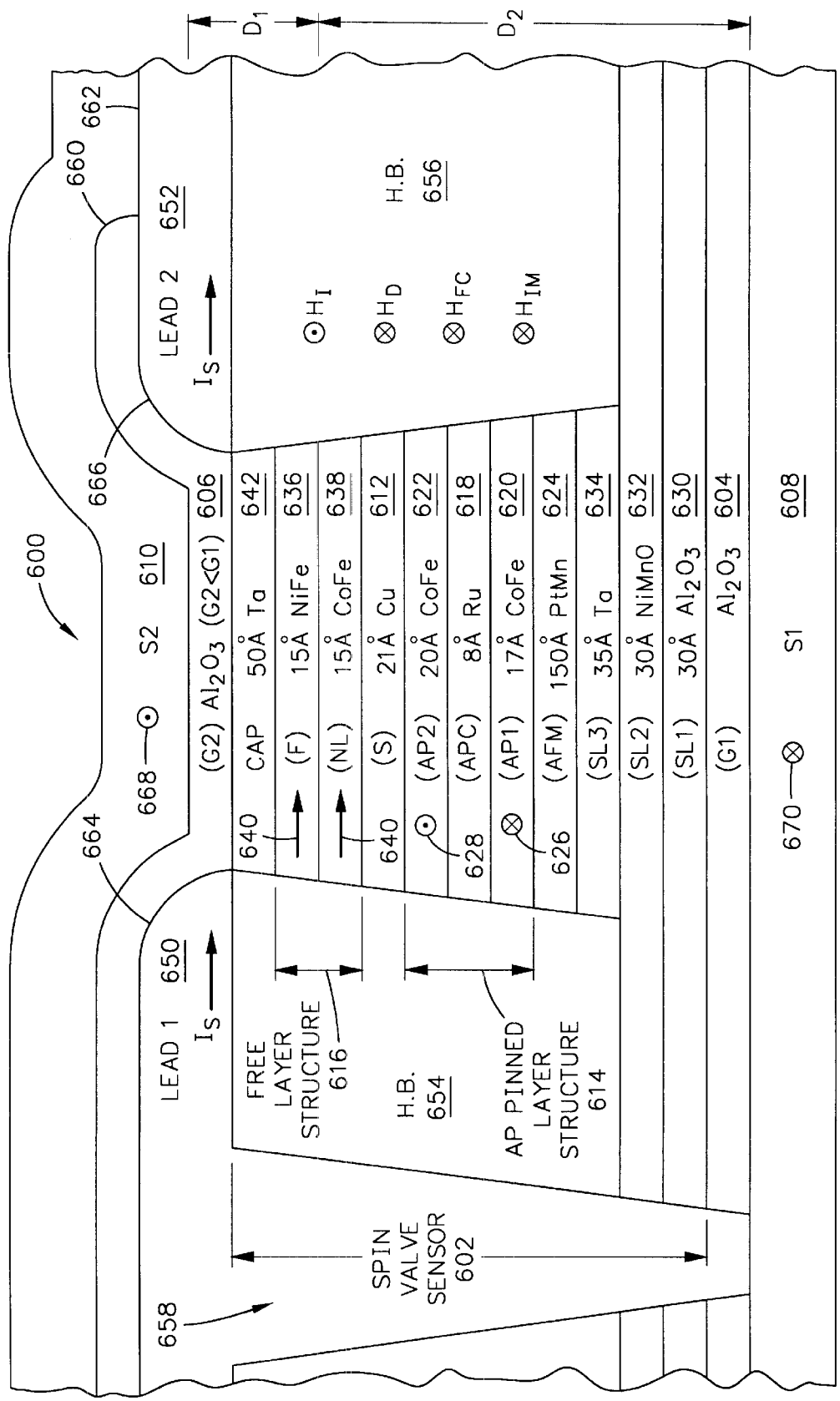
FIG. 11 is an ABS illustration of the present read head.

The present read head 600, shown in FIG. 11, includes a spin valve sensor 602 which is located between first and second gap layers (G1 and G2) 604 and 606 and the first and second gap layers are located between first and second shield layers (S1 and S2) 608 and 610. The spin valve sensor 602 includes a nonmagnetic electrically conductive spacer layer 612 which is located between an AP pinned layer structure 614 and a free layer structure 616. The AP pinned layer structure 614 has an antiparallel coupling layer (APC) 618 which is located between a ferromagnetic first AP pinned layer (AP1) 620 and a ferromagnetic second AP pinned layer (AP2) 622. The first AP pinned layer 620 is exchange coupled to an antiferromagnetic (AFM) pinning layer 624 so that a magnetic moment 626 of the first AP pinned layer is pinned perpendicular to the ABS, such as into the sensor as shown in FIG. 11. By a strong antiparallel coupling between the first and second AP pinned layers 620 and 622 the second AP pinned layer 622 has a magnetic moment 628 which is antiparallel to the magnetic moment 626. In this embodiment the second AP pinned layer 622 is thicker than the first AP pinned layer 620 so that a net demagnetizing (demag) field $H_D$ from the AP pinned layer structure 614 on the free layer structure 616 will be antiparallel to the magnetic moment 628.

A first seed layer (SL1) 630 is located on the first gap layer 604, a second seed layer (SL2) 632 is located on the first seed layer 630 and a third seed layer (SL3) 634 is located on the second seed layer 632. These seed layers, which influence the microstructures of subsequent spin valve sensor layers formed thereon, in combination with a predetermined thickness of the spacer layer 612, establish a negative ferromagnetic coupling field $-H_{FC}$, which is in the same direction as the net demag $H_D$ on the free layer structure 616.

The free layer structure 616 includes a ferromagnetic free layer (F) 636 and a ferromagnetic nanolayer (NL) 638. The free layer structure 616 has a magnetic moment 640 which is parallel to the ABS when there is readback symmetry and this direction can be from left to right as shown in FIG. 11. A cap layer 642 may be on the free layer structure 616 for protecting it from subsequent processing steps. When a signal field from a rotating magnetic disk rotates the magnetic moment 640 into the sensor it becomes more antiparallel to the magnetic moment 628 which increases the resistance of the spin valve sensor and when a signal field rotates the magnetic moment 640 out of the sensor it becomes more parallel to the magnetic moment 628 which decreases the resistance of the head. When the sense current $I_S$ is conducted through the spin valve sensor these changes in resistance cause potential changes which are processed as playback signals by the processing circuitry 50 in FIG. 3.

Exemplary thicknesses for the first and second gap layers 604 and 606 are 200 Å of aluminum oxide ($Al_2O_3$) for the first gap layer 604 and 100 Å of aluminum oxide ($Al_2O_3$) for the second gap layer 606. Exemplary thicknesses and materials for the spin valve sensor 602 are 30 Å of aluminum oxide ($Al_2O_3$) for the first seed layer 630, 30 Å of nickel manganese oxide (NiMnO) for the second seed layer 632, 35 Å of tantalum (Ta) for the third seed layer 634, 150 Å of platinum manganese (PtMn) for the pinning layer 624, 17 Å of cobalt iron (CoFe) for the first AP pinned layer 620, 8 Å of ruthenium (Ru) for the antiparallel coupling layer 618, 20 Å of cobalt iron (CoFe) for the second AP pinned layer 622, 21 Å of copper (Cu) for the spacer layer 612, 15 Å of cobalt iron (CoFe) for the nanolayer 638, 15 Å of nickel iron (NiFe) for the free layer 636 and 50 Å of tantalum (Ta) for the cap layer 642.

First and second lead layers 650 and 652 and first and second hard bias layers 654 and 656 are electrically connected to first and second side edges of the spin valve sensor. The first and second lead layers 650 and 652 may be constructed of tantalum (Ta) and the hard bias layers (HB) are constructed of a hard magnetic material such as cobalt platinum chromium (CoPtCr) which is also electrically conductive. The hard bias layers 654 and 656 provide longitudinal biasing of the free layer structure 616 for promoting a desirable single magnetic domain structure.

The invention electrically connects (shorts) the first and second lead layers 650 and 652 to the first and second shield layers 608 and 610. The first lead layer 650 may be shorted to the first shield layer 608 by a via 658 which is simply a hole filled with a conductive material such as copper which electrically connects the first lead layer 650 to the first shield layer 608. Accordingly, the first shield layer 608 becomes a lead layer extension for the first lead layer 650 all the way to a read head terminal such as that shown at 104 in FIG. 2. It can be seen that the second read gap layer 606 insulates the first lead layer 650 from the second shield layer 610. The second lead layer 652 is shorted to the second shield layer 610 by any suitable means such as terminating the second read gap layer 606 at 660 so that the second shield layer directly interfaces the second lead layer 652 at 662. Accordingly, the second shield layer now functions as a lead layer extension for the second lead layer 652 to the other terminal 106 shown in FIG. 2.

Since the first and second shield layers 608 and 610 carry most of the sense current $I_S$ to the terminals the first and second lead layers can be thinner than prior art first and second lead layers so that their steps at 664 and 666 can be less. Since there is less step coverage for the second read gap layer 606 it can be thinner than prior art second read gap layers so that the free layer structure 616 can be located closer to the second shield layer 610. This will increase an image current field 668 from the second shield layer on the free layer structure 616 and reduce an image current field 670 from the first shield layer on the free layer structure. Accordingly, there is a stronger net image current field $H_{IM}$ which can be employed for counterbalancing the net sense current field $H_I$.

When the sense current $I_S$ is conducted through the spin valve sensor 602 it can be seen that the net sense current field $H_I$, which is due to the conductive layers below the free layer structure minus the cap layer 642 above the free layer structure, is directed through the free layer structure 616 and thence out of the page. This is the largest of the fields acting on the free layer structure 616 affecting its biasing and must be counterbalanced for read signal symmetry. Since the second AP pinned layer 622 is thicker than the first and second AP pinned layers 620 and 622 there is a net demag field $H_D$ through the free layer structure 616 which is directed into the page. When a platinum manganese (PtMn) pinning layer 624 is employed there is a negative ferromagnetic coupling field $H_{FC}$ from the second AP pinned layer 622 on the free layer structure 616 which is directed out of the page. The invention locates the center of the free layer structure closer to the second shield layer 610 than the first shield layer 608 ($D_1<D_2$) so that there is a net image current field $H_{IM}$ which works in cooperation with the ferromagnetic coupling field $H_{FC}$ and the demag field $H_D$ to counterbalance the sense current field $H_I$. In the preferred embodiment the second gap layer 606 is thinner than the first gap layer 604 so as to place the magnetic center of the free layer structure 616 closer to the second shield layer 610 and thereby increase the net image current field $H_{IM}$ on the free layer structure for improving read signal symmetry.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a spin valve sensor;
   first and second leads connected to the spin valve sensor;
   nonmagnetic nonconductive first and second read gap layers;
   the spin valve sensor and the first and second leads being located between the first and second read gap layers;
   ferromagnetic first and second shield layers;
   the first and second read gap layers being located between the first and second shield layers with the first read gap layer interfacing the first shield layer and the second read gap layer interfacing the second shield layer;
   said second lead layer being electrically connected to the second shield layer; and
   the second read gap layer extending over an entirety of the first lead layer so as to completely insulate the first lead layer from the second shield layer, and the second read gap layer not extending over at least a portion of the second lead layer so that the second lead layer interfaces the second shield layer for the electrical connection therewith.

2. A magnetic read head as claimed in claim 1 wherein the spin valve sensor includes:
   a spin valve sensor;
   first and second leads connected to the spin valve sensor;
   nonmagnetic nonconductive first and second read gap layers;
   the spin valve sensor and the first and second leads being located between the first and second read gap layers;
   ferromagnetic first and second shield layers;
   the first and second read gap layers being located between the first and second shield layers with the first read gap layer interfacing the first shield layer and the second read gap layer interfacing the second shield layer; and
   one of the first and second lead layers being electrically connected to the second shield layer:
   the spin valve sensor including:
      a free layer structure that has a magnetic moment;
      a ferromagnetic pinned layer structure that has a net magnetic moment;
      a nonmagnetic conductive spacer layer located between the free layer structure and the pinned layer structure; and
      an antiferromagnetic pinning layer exchange coupled to the pinned layer structure for pinning the net magnetic moment of the pinned layer structure, and
      the free layer structure being located between the spacer layer and the second read gap layer.

3. A magnetic read head as claimed in claim 2 including:
   said one of the first and second lead layers being said second lead layer; and
   the second read gap layer extending over an entirety of the first lead layer so as to completely insulate the first lead layer from the second shield layer, and the second read gap layer not extending over at least a portion of the second lead layer so that the second lead layer interfaces the second shield layer for the electrical connection therewith.

4. A magnetic read head as claimed in claim 2 including:
   a magnetic center of the free layer structure being closer to the second shield layer than to the first shield layer.

5. A magnetic read head as claimed in claim 2 wherein the first pinned layer structure is an antiparallel (AP) pinned layer structure that includes:
   ferromagnetic first and second antiparallel (AP) pinned layers with the first AP pinned layer interfacing the pinning layer and the second AP pinned layer interfacing the spacer layer; and
   an antiparallel (AP) coupling layer located between and interfacing the first and second AP pinned layers.

6. A magnetic read head as claimed in claim 2 wherein the pinning layer is platinum manganese (PtMn).

7. A magnetic read head as claimed in claim 2 wherein upon conducting a sense current through the read head a net sense current field acting on the free layer structure from all conductive layers other than the free layer structure is opposed by a net image current field acting on the free layer structure from the first and second shield layers.

8. A magnetic read head as claimed in claim 7 wherein upon conducting a sense current through the spin valve sensor, a sense current field $H_I$ equals a demagnetizing field $H_D$, a ferromagnetic field $H_{FC}$ and an image current field $H_{IM}$ on the free layer structure.

9. A magnetic read head as claimed in claim 2 wherein the second read gap layer has a thickness that is less than a thickness of the first read gap layer.

10. A magnetic read head as claimed in claim 9 including:
    said one of the first and second lead layers being said second lead layer; and
    the second read gap layer extending over an entirety of the first lead layer so as to completely insulate the first lead layer from the second shield layer, and the second read gap layer not extending over at least a portion of the second lead layer so that the second lead layer interfaces the second shield layer for the electrical connection therewith.

11. A magnetic read head as claimed in claim 10 including:
    a magnetic center of the free layer structure being closer to the second shield layer than to the first shield layer.

12. A magnetic read head as claimed in claim 11 wherein the first pinned layer structure is an antiparallel (AP) pinned layer structure that includes:
    ferromagnetic first and second antiparallel (AP) pinned layers with the first AP pinned layer interfacing the pinning layer and the second AP pinned layer interfacing the spacer layer; and
    an antiparallel (AP) coupling layer located between and interfacing the first and second AP pinned layers.

13. A magnetic read head as claimed in claim 12 wherein the pinning layer is platinum manganese (PtMn).

14. A magnetic read head as claimed in claim 13 wherein upon conducting a sense current through the spin valve sensor, a sense current field $H_I$ equals a demagnetizing field $H_D$, a ferromagnetic field $H_{FC}$ and an image current field $H_{IM}$ on the free layer structure.

15. A magnetic head assembly comprising:
    a write head including:
       ferromagnetic first and second pole piece layers that have a yoke portion located between a pole tip portion and a back gap portion;
       a nonmagnetic write gap layer located between the pole tip portions of the first and second pole piece layers;
       an insulation stack with at least one coil layer embedded therein located between the yoke portions of the first and second pole piece layers; and
       the first and second pole piece layers being connected at their back gap portions; and
    a read head including:
       a spin valve sensor;
       first and second leads connected to the spin valve sensor;

nonmagnetic nonconductive first and second read gap layers;

the spin valve sensor and the first and second leads being located between the first and second read gap layers;

ferromagnetic first and second shield layers;

the first and second read gap layers being located between the first and second shield layers with the first read gap layer interfacing the first shield layer and the second read gap layer interfacing the second shield layer; and one of the first and second lead layers being electrically connected to the second shield layer;

the spin valve sensor including:

a free layer structure that has a magnetic moment;

a ferromagnetic pinned layer structure that has a net magnetic moment;

a nonmagnetic conductive spacer layer located between the free layer structure and the pinned layer structure;

an antiferromagnetic pinning layer exchange coupled to the pinned layer structure for pinning the net magnetic moment of the pinned layer structure; and the free layer structure being located between the spacer layer and the second read gap layer.

16. A magnetic head assembly as claimed in claim 15 wherein the second read gap layer has a thickness that is less than a thickness of the first read gap layer.

17. A magnetic head assembly as claimed in claim 16 including:

said one of the first and second lead layers being said second lead layer; and the second read gap layer extending over an entirety of the first lead layer so as to completely insulate the first lead layer from the second shield layer, and the second read gap layer not extending over at least a portion of the second lead layer so that the second lead layer interfaces the second shield layer for the electrical connection therewith.

18. A magnetic head assembly as claimed in claim 17 including:

a magnetic center of the free layer structure being closer to the second shield layer than to the first shield layer.

19. A magnetic head assembly as claimed in claim 18 wherein the first pinned layer structure is an antiparallel (AP) pinned layer structure that includes:

ferromagnetic first and second antiparallel (AP) pinned layers with the first AP pinned layer interfacing the pinning layer and the second AP pinned layer interfacing the spacer layer; and an antiparallel (AP) coupling layer located between and interfacing the first and second AP pinned layers.

20. A magnetic head assembly as claimed in claim 19 wherein the pinning layer is platinum manganese (PtMn).

21. A magnetic head assembly as claimed in claim 20 wherein upon conducting a sense current through the spin valve sensor, a sense current field $H_I$ equals a demagnetizing field $H_D$, a ferromagnetic field $H_{FC}$ and an image current field $H_{IM}$ on the free layer structure.

22. A magnetic disk drive including at least one magnetic head assembly that includes a write head and a read head, the read head including a spin valve sensor, comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

a spin valve sensor;

first and second leads connected to the spin valve sensor;

nonmagnetic nonconductive first and second read gap layers;

the spin valve sensor and the first and second leads being located between the first and second read gap layers;

ferromagnetic first and second shield layers;

the first and second read gap layers being located between the first and second shield layers with the first read gap layer interfacing the first shield layer and the second read gap layer interfacing the second shield layer; and one of the first and second lead layers being electrically connected to the second shield layer;

the spin valve sensor including:

a free layer structure that has a magnetic moment;

a ferromagnetic pinned layer structure that has a net magnetic moment;

a nonmagnetic conductive spacer layer located between the free layer structure and the pinned layer structure;

an antiferromagnetic pinning layer exchange coupled to the pinned layer structure for pinning the net magnetic moment of the pinned layer structure; and the free layer structure being located between the spacer layer and the second read gap layer;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

23. A magnetic disk drive as claimed in claim 22 wherein the first pole layer and the second shield layer are a common layer.

24. A magnetic disk drive as claimed in claim 22 including a nonmagnetic isolation layer located between the second shield layer and the first pole piece layer.

25. A magnetic disk drive as claimed in claim 22 wherein the second read gap layer has a thickness that is less than a thickness of the first read gap layer.

26. A magnetic disk drive as claimed in claim 25 including:

said one of the first and second lead layers being said second lead layer; and the second read gap layer extending over an entirety of the first lead layer so as to completely insulate the first lead layer from the second shield layer, and the second read gap layer not extending over at least a portion of the second lead layer so that the second lead layer interfaces the second shield layer for the electrical connection therewith.

27. A magnetic disk drive as claimed in claim 26 including:
a magnetic center of the free layer structure being closer to the second shield layer than to the first shield layer.

28. A magnetic disk drive as claimed in claim 27 wherein the first pinned layer structure is an antiparallel (AP) pinned layer structure that includes:
ferromagnetic first and second antiparallel (AP) pinned layers with the first AP pinned layer interfacing the pinning layer and the second AP pinned layer interfacing the spacer layer; and
an antiparallel (AP) coupling layer located between and interfacing the first and second AP pinned layers.

29. A magnetic disk drive as claimed in claim 28 wherein the pinning layer is platinum manganese (PtMn).

30. A magnetic disk drive as claimed in claim 29 wherein upon conducting a sense current through the spin valve sensor, a sense current field $H_I$ equals a demagnetizing field $H_D$, a ferromagnetic field $H_{FC}$ and an image current field $H_{IM}$ on the free layer structure.

31. A method of making a read head comprising the steps of:
forming a spin valve sensor;
connecting first and second leads to the spin valve sensor;
forming nonmagnetic nonconductive first and second read gap layers with the spin valve sensor and the first and second leads located between the first and second read gap layers;
forming ferromagnetic first and second shield layers with the first and second read gap layers located between the first and second shield layers and with the first read gap layer interfacing the first shield layer and the second read gap layer interfacing the second shield layer;
electrically connecting said second lead layer to the second shield layer; and
forming the second read gap layer over an entirety of the first lead layer so as to completely insulate the first lead layer from the second shield layer and not forming the second read gap layer over at least a portion of the second lead layer so that the second lead layer interfaces the second shield layer for the electrical connection therewith.

32. A method of making a read head comprising the steps of:
forming a spin valve sensor;
connecting first and second leads to the spin valve sensor;
forming nonmagnetic nonconductive first and second read gap layers with the spin valve sensor and the first and second leads located between the first and second read gap layers;
forming ferromagnetic first and second shield layers with the first and second read gap layers located between the first and second shield layers and with the first read gap layer interfacing the first shield layer and the second read gap layer interfacing the second shield layer; and
electrically connecting one of the first and second lead layers to the second shield layer;
the forming of the spin valve sensor including the steps of:
forming a free layer structure that has a magnetic moment;
forming a ferromagnetic pinned layer structure that has a net magnetic moment;
forming a nonmagnetic conductive spacer layer between the free layer structure and the pinned layer structure;
forming an antiferromagnetic pinning layer exchange coupled to the pinned layer structure for pinning the net magnetic moment of the pinned layer structure; and
forming the free layer structure between the spacer layer and the second read gap layer.

33. A method of making a read head as claimed in claim 32 including:
said one of the first and second lead layers being said second lead layer; and
forming the second read gap layer over an entirety of the first lead layer so as to completely insulate the first lead layer from the second shield layer and the second read gap layer and not forming the second read gap layer over at least a portion of the second lead layer so that the second lead layer interfaces the second shield layer for the electrical connection therewith.

34. A method of making a read head as claimed in claim 32 including:
forming the spin valve sensor so that a magnetic center of the free layer structure is closer to the second shield layer than to the first shield layer.

35. A method of making a read head as claimed in claim 32 wherein the first pinned layer structure is an antiparallel (AP) pinned layer structure that is made comprising the steps of:
forming ferromagnetic first and second antiparallel (AP) pinned layers with the first AP pinned layer interfacing the pinning layer and the second AP pinned layer interfacing the spacer layer; and
forming an antiparallel (AP) coupling layer between and interfacing the first and second AP pinned layers.

36. A method of making a read head as claimed in claim 32 wherein the pinning layer is formed of platinum manganese (PtMn).

37. A method of making a read head as claimed in claim 32 wherein the spin valve sensor is formed so that upon conducting a sense current through the sensor a net sense current field acting on the free layer structure from all conductive layers other than the free layer structure is opposed by a net image current field acting on the free layer structure from the first and second shield layers.

38. A method of making a read head as claimed in claim 37 wherein the spin valve sensor is formed so that upon conducting a sense current through the spin valve sensor, a sense current field $H_I$ equals a demagnetizing field $H_D$, a ferromagnetic field $H_{FC}$ and an image current field $H_{IM}$ on the free layer structure.

39. A method of making a read head as claimed in claim 32 wherein the second read gap layer is formed with a thickness that is less than a thickness of the first read gap layer.

40. A method of making a read head as claimed in claim 39 including:
said one of the first and second lead layers being said second lead layer; and
forming the second read gap layer over an entirety of the first lead layer so as to completely insulate the first lead layer from the second shield layer and not forming the second read gap layer over at least a portion of the second lead layer so that the second lead layer interfaces the second shield layer for the electrical connection therewith.

41. A method of making a read head as claimed in claim 40 including:

forming the spin valve sensor so that a magnetic center of the free layer structure is closer to the second shield layer than to the first shield layer.

42. A method of making a read head as claimed in claim 41 wherein the first pinned layer structure is an antiparallel (AP) pinned layer structure that is made comprising the steps of:

forming ferromagnetic first and second antiparallel (AP) pinned layers with the first AP pinned layer interfacing the pinning layer and the second AP pinned layer interfacing the spacer layer; and forming an antiparallel (AP) coupling layer between and interfacing the first and second AP pinned layers.

43. A method of making a read head as claimed in claim 42 wherein the pinning layer is formed of platinum manganese (PtMn).

44. A method of making a read head as claimed in claim 43 wherein the spin valve sensor is formed so that upon conducting a sense current through the spin valve sensor, a sense current field $H_I$ equals a demagnetizing field $H_D$, a ferromagnetic field $H_{FC}$ and an image current field $H_{IM}$ on the free layer structure.

45. A method of making a magnetic head assembly comprising the steps of:

making a write head including the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

forming a spin valve sensor;

connecting first and second leads to the spin valve sensor;

forming nonmagnetic nonconductive first and second read gap layers with the spin valve sensor and the first and second leads located between the first and second read gap layers;

forming ferromagnetic first and second shield layers with the first and second read gap layers located between the first and second shield layers and with the first read gap layer interfacing the first shield layer and the second read gap layer interfacing the second shield layer; and electrically connecting one of the first and second lead layers to the second shield layer;

making of the spin valve sensor including the steps of:

forming a free layer structure that has a magnetic moment;

forming a ferromagnetic pinned layer structure that has a net magnetic moment;

forming a nonmagnetic conductive spacer layer between the free layer structure and the pinned layer structure;

forming an antiferromagnetic pinning layer exchange coupled to the pinned layer structure for pinning the net magnetic moment of the pinned layer structure; and forming the free layer structure between the spacer layer and the second read gap layer.

46. A method of making a magnetic head assembly as claimed in claim 45 wherein the first pole layer and the second shield layer are formed as a common layer.

47. A method of making a magnetic head assembly as claimed in claim 45 including forming a nonmagnetic isolation layer between the second shield layer and the first pole piece layer.

48. A method of making a magnetic head assembly as claimed in claim 45 wherein the second read gap layer is formed with a thickness that is less than a thickness of the first read gap layer.

49. A method of making a magnetic head assembly as claimed in claim 48 including:

said one of the first and second lead layers being said second lead layer; and forming the second read gap layer over an entirety of the first lead layer so as to completely insulate the first lead layer from the second shield layer and not forming the second read gap layer over at least a portion of the second lead layer so that the second lead layer interfaces the second shield layer for the electrical connection therewith.

50. A method of making a magnetic head assembly as claimed in claim 49 including:

forming the spin valve sensor so that a magnetic center of the free layer structure is closer to the second shield layer than to the first shield layer.

51. A method of making a magnetic head assembly as claimed in claim 50 wherein the first pinned layer structure is an antiparallel (AP) pinned layer structure that is made comprising the steps of:

forming ferromagnetic first and second antiparallel (AP) pinned layers with the first AP pinned layer interfacing the pinning layer and the second AP pinned layer interfacing the spacer layer; and forming an antiparallel (AP) coupling layer between and interfacing the first and second AP pinned layers.

52. A method of making a magnetic head assembly as claimed in claim 51 wherein the pinning layer is formed of platinum manganese (PtMn).

53. A method of making a magnetic head assembly as claimed in claim 52 wherein the spin valve sensor is formed so that upon conducting a sense current through the spin valve sensor, a sense current field $H_I$ equals a demagnetizing field $H_D$, a ferromagnetic field $H_{FC}$ and an image current field $H_{IM}$ on the free layer structure.

* * * * *